March 14, 1972   E. C. PETERSON   3,649,513
SYSTEM FOR PREVENTION OF FROST HEAVES IN HIGHWAYS
Filed Aug. 6, 1970
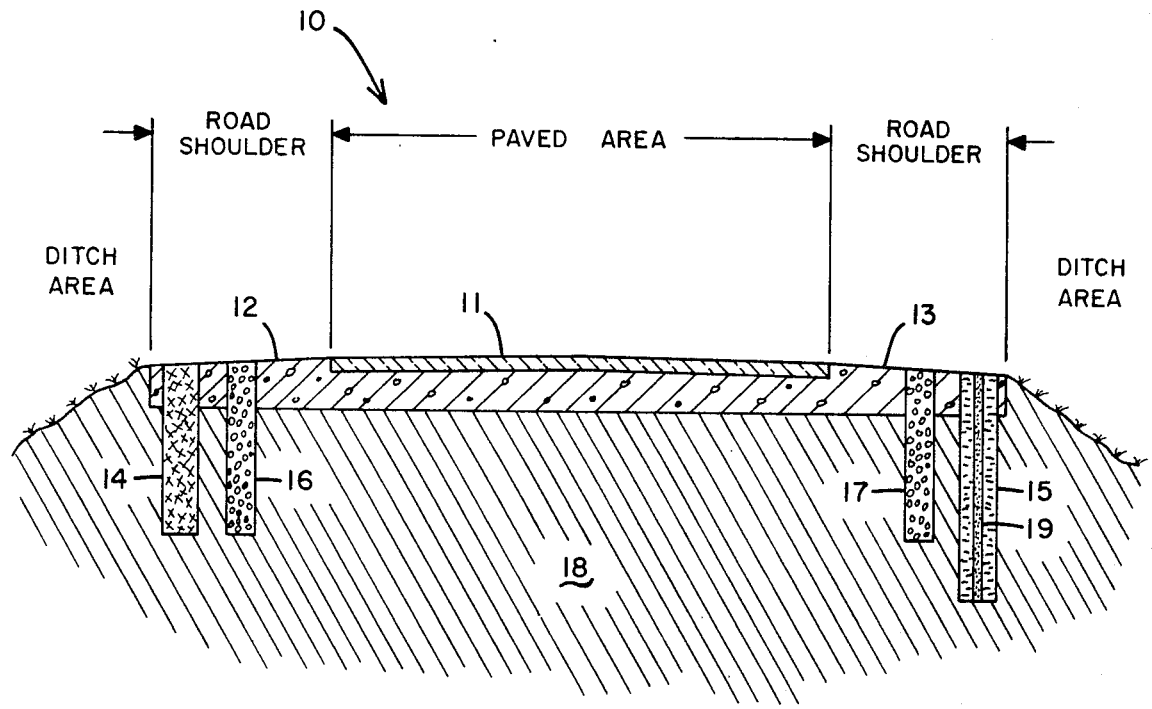
INVENTOR
EARL C. PETERSON
BY
ATTORNEY 3,649,513
SYSTEM FOR PREVENTION OF FROST
HEAVES IN HIGHWAYS
Earl C. Peterson, 1300 Kelly Drive N.,
Minneapolis, Minn. 55427
Filed Aug. 6, 1970, Ser. No. 61,684
Int. Cl. B01d 13/02; B01k 5/00
U.S. Cl. 204—299                                6 Claims

ABSTRACT OF THE DISCLOSURE

Improved means for controlling the moisture content and ultimate freezing parameters of a roadbed including, a combination of electrolytic means together with a conventional roadbed, the electrolytic means being utilized to control the moisture migration through the soil. The system comprises therefore, a combination of a roadbed having a centrally disposed paved zone flanked by lateral shoulder zones, and electrolytic means along said shoulder zones for controlling the moisture migration through the soil. The electrolytic means includes a plurality of spaced electrodes, including a plurality of anodes and a plurality of cathodes arranged in spaced relationship along the lateral shoulder zones. The anode means include crushed or finely divided iron particles, such as, for example, ground scrap iron or the like arranged in bores formed in the lateral shoulder areas; the cathode means including pulverized carbon particles such as, for example, pulverized coke or the like disposed in bores formed along the same or the opposite shoulder area from the anode means. If desired, additional rock-filled bores may be disposed adjacent the electrodes, with creosote oil being applied to the bores and to the materials filling the bores.

BACKGROUND OF THE INVENTION

The present invention relates generally to improved system for control of moisture migration through the soil along, adjacent, and under paved roadbeds, and more specifically to an electrolytic means for the control of such moisture migration. The electrolytic means includes the provision of anodes and cathodes arranged in either spaced apart or oppositely disposed relationship along the paved zone, the anodes being formed from iron, such as, from ground or pulverized scrap iron, and with the cathodes being formed of conductive carbon, such as, for example, pulverized coke or the like. With this arrangement of components, it has been found that moisture migration may be controlled through the soil structure disposed between the individual anodes and cathodes.

In the past, electro-osmosis has been utilized for control of moisture conditions in soil, such as, for example, for controlling the leeching of certain undesirable salts from soil structures. Normally, these systems have included the intentional disposition of water in the control area, with the application of an electrical field being utilized to exert an affect upon the soil, including affecting the salts which may be present in the soil. The present arrangement is utilized for the control of undesired moisture which may be present beneath roadbed surfaces, and with improved drainage of moisture from said areas.

In certain soils, such as, for example, clay soils and the like, it has been found that the application of an electrical field through the soil may enhance the ability of the soil to dispose of water and water particles.

In the application of the present concept to treatment of roadbeds, it is readily appreciated that damage to roadbeds occurs when the roadbed undergoes freeze-thaw cycles in the presence of excessive quantities of moisture. This moisture contributes to the formation of frost heaves and the like in the roadbed, the frost heaves requiring extensive repair to restore the surface. The arrangement of the present invention enables the loss or dissipation of moisture from the area beneath the roadbed, thus decreasing the tendency toward frost heaves and the like.

SUMMARY OF THE INVENTION

Therefore, in accordance with the present invention, a roadbed is provided with an electrolytic means for the control of moisture migration through the soil beneath the roadbed, the electrolytic means including a plurality of spaced anodes and cathodes, the electrodes being disposed laterally along the shoulder areas of the roadbed. In one embodiment, along one side of the roadbed, a plurality of anodes are formed, these anodes comprising iron particles arranged in a bore formed in the shoulder area, with the cathodes comprising ground carbon, such as coke or the like, being arranged in a bore formed on the opposite shoulder area from the anode. These electrodes contribute to the impression of a field across or through the subterranean area of the roadbed and have been found to enhance the control of moisture migration or permeation through the soil area. The resulting drying of the soil contributes to the reduction of the number of frost heaves occurring in the roadbed surface. This arrangement is particularly desirable for use in connection with bituminous pavement surfaces, but is also adaptable for use with pavement formed of concrete.

Therefore, it is a principal object of the present invention to provide for an improved electrolytic means for the control of moisture migration through the soil beneath paved zones of roadbeds.

It is yet a further object of the present invention to provide a plurality of spaced anode and cathode pairs along opposite sides of a paved zone of a roadbed, the anodes being formed of columns of crushed or ground iron, with the cathodes being formed of crushed carbon such as coke or the like.

It is yet a further object of the present invention to provide an improved system for the control of moisture migration in roadbed areas, and including a plurality of oppositely disposed anode and cathode pairs flanking a paved zone of a roadbed, each electrode being provided with a drainage bore or plug at a point adjacent thereto.

Other and further objects of the present invention will become apparent to those skilled in the art upon a study of the following specification, appended claims, and accompanying drawing.

BRIEF DESCRIPTION OF THE DRAWING

FIG. 1 is a vertical sectional view taken along a typical roadbed surface, and illustrating the arrangement of the present invention along the roadbed.

DESCRIPTION OF THE PREFERRED EMBODIMENT

In the preferred embodiment of the present invention, and with particular attention being directed to the drawing, the roadbed system generally designated 10 includes a paved zone 11 flanked by lateral shoulder zones 12 and 13. The paved zone is preferably comprised of bituminous material, but may, as indicated, be formed of concrete. These surfaces are commonly used in road building today, and the system of the present invention is adaptable for each type of surface.

Electrodes are formed on opposite sides of the paved area, and in the laterally arranged shoulder zones, these electrodes being shown at 14 and 15. The anode 14 is preferably comprised of crushed or ground scrap iron, this crushed or ground scrap iron being used to fill a bore formed in the shoulder area and located close to the road surface. In a typical installation, the bore is formed to a suitable diameter, preferably about 12 inches in diameter, and augered to a depth which preferably extends below the normal frost line in the area, such as, for example, about 5 feet. In areas where the frost level does not extend to 5-foot depths, such a depth would be desired as a practical minimum, for the purpose of establishing sufficient field potential across the pavement area. These anodes are formed at regular intervals along the shoulder, and are preferably about 10 feet on center. The scrap metal is preferably compacted in the bore.

The cathodes are formed from crushed coke breeze, mixed rock and graphite, or the like, the bores forming the cathodes being essentially the same size as the bores forming the anodes, and also spaced apart the same distance as the anodes. In some cases, the cathode bores should be more closely disposed, one to another. A continuous trench of conductive cathode may also be employed. The core 19 of the cathode 15 is preferably a core filled with flaked graphite, the graphite being compacted within the center of the coke forming the cathode 15. When moisture is present in the roadbed, a field develops between the anodes and cathodes with a magnitude of about 0.8 volt, and it has been found that water will migrate toward the surface under the influence of the field. The anode, being formed of scrap iron, is normally sacrificial, and thus will dissolve over an extended period of time, and should accordingly be replaced, as required.

If desired, additional bores may be formed in the shoulder areas adjacent the individual electrodes. Such holes are shown at 16 and 17 in the drawing, and are preferably filled with crushed rock, such as, for example, rock having a normal size of between ¾-inch and 1 inch. The bores 16 and 17 are preferably filled with a hydrophobic substance. Also, areas surrounding culverts and the like may be filled with creosote oil impregnated soil. The depth of the individual bores 16 and 17 is preferably greater than the normal depth of frost penetration, thereby permittinng moisture to dissipate through these areas adjacent the individual electrodes. As is indicated in the drawing, the sub-grade of the roadbed 18 is under the influence of the field established between the individual anodes and cathodes.

In certain instances, it may be desirable to apply or impress a DC current across the anode and cathode pairs. Such a current should preferably be in the direction of the electrolytic cell, and can be of a modest magnitude, such as, in the range of 6–12 volts.

The precise mechanism of operation of the system of the present invention is not entriely understood, however it is believed that the electrical field established by the anode and cathode pairs contributes to the reduction of moisture in the sub-grade of the roadbed. Current flow is possible through the roadbed area due to the presence of salts which normally occur in soils.

If a DC field or potential is applied across the anode and cathode, this may be accomplished by driving an electrically conductive rod into each electrode of an anode-cathode pair, and coupling a source of electrical energy between said rods.

I claim:

1. In combination with a roadbed having a centrally disposed paved zone flanked by lateral shoulder zones, electrolytic means for the control of moisture migration through the soil and comprising:
   (a) a plurality of spaced anode means disposed laterally along one side of said paved zone and generally equally spaced from the central axis of said roadbed, and a plurality of spaced cathode means disposed laterally along one side of said paved zone and electrolytically coupled to said anodes, and being spaced from the axis of said roadbed;
   (b) said anode means comprising a plurality of generally conically formed columns of iron particles disposed in bores formed along said roadbed; and
   (c) said cathode means comprising a quantity of finely divided carbon particles disposed in bores formed along said roadbed.

2. The combination as set forth in claim 1 being particularly characterized in that rock-filled bores are formed adjacent each of said anodes and cathodes.

3. The combination as set forth in claim 2 being particularly characterized in that the said bores are filled with a hydrophobic film.

4. The combination as set forth in claim 3 being particularly characterized in that said hydrophobic film is creosote oil, and said bores are disposed inwardly toward said paved zone from said anodes and cathodes.

5. The combination as set forth in claim 1 being particularly characterized in that said cathode comprises a sleeve of crushed coke, having a core of finely divided graphite disposed coaxially therein.

6. The combination as set forth in claim 1 being particularly characterized in that means are provided for the application of a direct current field between said anode and cathode.

References Cited
UNITED STATES PATENTS

| | | | |
|---|---|---|---|
| 2,211,696 | 8/1940 | Irons | 166—21 |
| 2,625,374 | 1/1953 | Neuman | 255—1.8 |
| 2,831,804 | 4/1958 | Collopy | 204—180 X |
| 3,417,823 | 12/1958 | Faris | 166—45 |

JOHN H. MACK, Primary Examiner

A. C. PRESCOTT, Assistant Examiner

U.S. Cl. X.R.

204—180 R